United States Patent Office 2,817,686
Patented Dec. 24, 1957

2,817,686

PROCESS FOR CONVERTING ALCOHOLS TO CHLORIDES

Joseph C. Lo Cicero, Moorestown, N. J., and Robert T. Johnson, Philadelphia, Pa., assignors to Rohm & Haas Company, Philadelphia, Pa., a corporation of Delaware No Drawing. Application February 25, 1954
Serial No. 412,657

8 Claims. (Cl. 260—613)

This invention relates to an improved method for converting alcohols to chlorides. It more particularly refers to an improved method for converting certain types of alcohols to the corresponding chlorides using thionyl chloride as the converting agent in the presence of relatively small amounts of finely divided carbon.

The reaction involving alcohol and thionyl chloride, as is well known in the art, occurs in varying degrees without catalysis, and with some known catalysts, such as pyridine, often results in yields of 85 to 93%. Even with yields as high as those stated, there still remains some unreacted components as well as some by-products formed by undesirable side reactions. The presence of compounds other than the desired product, including the catalyst when used, even though in the relatively small percentage range of about 7 to 15%, presents many cumbersome problems of separation before a pure product is obtained. Also, the presence of compounds other than the product frequently adds undesirable discoloration to the product. The present invention concerns a process that is practically quantitative, that is, none of the original reagents remains, nor are any undesirable byproducts present to contaminate and discolor the product. A simple filtration, to remove the finely divided carbon, is all that need be done, after the completion of the desired reaction, to obtain a pure product.

When alcohols are reacted with thionyl chloride, according to the usual methods employed heretofore, to form the corresponding chlorides a product results which frequently has so great a color as to be immeasurable on the Gardner color scale (Standards of 1933). The highest figure on the Gardner color scale is 18 which represents the darkest color measureable by this method. If carbon is used as a decolorizing agent near or at the completion of the reaction, as is the usual way, the color of the product is improved to some varying extent, but the value on the Gardner color scale is never lower than 8 and is frequently 15 or above. If the reaction is conducted according to the present invention, the color of the product is usually 2 to 4 on the Gardner color scale and frequently lower. Since chlorinated products tend to develop varying degrees of discoloration it is important that the reactant be as pure as possible. Purified, colorless thionyl chloride may be obtained according to the method described in patent application Serial Number 412,656, filed February 25, 1954, now abandoned, in the hands of a common assignee.

The carbon used in the process is that commercially available as finely divided activated carbon. It can be used without any additional preparatory treatment of purification or activation. The amount of carbon used may vary from ½ to 5% with the preferred range, in most cases, being about 1 to 2%. For maximum results, the carbon should be introduced into the reacting system at the beginning of the reaction period. Introduction at different later times decreases, approximately proportionately, the effect of the carbon on the reaction results.

The role of the carbon in the reaction is twofold. It serves simultaneously as a catalytic agent and as a decoloring agent. Charcoal, of course, in its finely divided state, is a well-known decolorizing agent. However, in the present instance, the amount of carbon used, particularly in the preferred range, is well below that generally required in decolorizing situations. By directing the reaction and controlling the products formed, the carbon, introduced at the outset of the reaction, effectively decolorizes even though present in relatively small amounts. This effect is greater than mere decolorization, in the sense that such is presently known, because if the carbon is added at a time appreciably after the reaction has started or after the reaction has been completed, as would be the usual method, the decolorizing effect is greatly reduced. This is particularly true in the cases of alcohols having higher molecular weights and longer skeletal chains. It is, therefore, important that the carbon be introduced before or substantially at the beginning of the reaction.

The presence of carbon in the instant reaction has another effect heretofore unknown. Although the reaction between alcohols and thionyl chloride occurs to a certain degree in the absence of a catalyst or to a greater degree with previously-known catalysts, the presence of carbon improves the reaction and carries it to a practically quantitative conclusion. The tedious and time-consuming operations of separation and purification ordinarily necessary are thereby obviated. The carbon is removed by a simple filtration. A filter aid may be employed, if desired, but such is not generally necessary.

The conversion of the chosen alcohol to the corresponding chloride may be accomplished at any suitable temperature, but generally above about 70° C. and up to about 150° C. There actually is no set upper limit of temperature, it being largely a matter of convenience. The preferable range for the reaction is from about 90° to 110° C. Up to about 120° C. the reaction may generally be conducted at normal atmospheric pressure, but above that point pressure may be applied to the system because of the volatility of thionyl chloride. Similarly, pressures greater than atmospheric may be employed, at any desired temperature, if the volatility of the alcohol used suggests it. It is preferable, generally, to conduct the reaction at as low a temperature as possible in order to minimize and substantially eliminate the darkening tendencies of the reactants and product.

The time required for complete reaction is usually under three hours and frequently is less than one hour depending largely on the identity and concomitant characteristics of the alcohol being reacted. Observable evolution of sulfur dioxide and hydrogen chloride occurs as the reaction progresses. Cessation of this evolution is an indica- dioxide and hydrogen chloride are evolved on formation tion of the completion of the reaction. Both the sulfur dioxide and hydrogen chloride are evolved on formation and hence withdrawn from the environment of the product, thereby avoiding contamination thereof.

Essentially anhydrous conditions of reaction are desirable in order that there be no interference with the functioning of the thionyl chloride. Since water reacts with thionyl chloride, it should be excluded from the reaction environment.

The present reaction may be employed generally with alcohols, giving a practically quantitative result. However, in some of the simpler alcohols color bodies seem to be retained. Although the subject process may be employed generally with alcohols, it is particularly valuable in the case of alcohols that have higher molecular weights and longer skeletal chains. In these instances the formation of by-products or the presence of original unreacted components is particularly objectionable because of the complex burdensome procedures of separation and purification necessary to obtain a pure product. The process of the present invention has been found to be especially valuable in the field of surface-active compounds, particularly detergent materials, where it is important to obtain pure, light-colored products. For instance, it has been found, using formerly-known methods, that it is extremely troublesome to form pure, light-colored chlorides from alcohols having the general formulas ROH, $R(OC_2H_4)_nOH$, and $R'(OC_2H_4)_nOH$, in which R may represent an alkyl group of eight to eighteen carbon atoms, R' may represent an alkylphenyl group in which the total number of carbon atoms in the alkyl portion is six to fifteen, and $n$ is an integer from one to eighteen or more. The alkyl portion of the alkylphenyl group may be made up of one or more alkyl groups. The present process succeeds in producing a pure product having Gardner color values of 4 or below. This pure, light-colored product is then suitable for use in the preparation of the corresponding sulfonate, which is a compound of valuable detergent properties. By using the present process in this and similar reactions involving the conversion of an alcohol to the corresponding chloride a marked economy in time and effort is realized.

Among the many typical compounds that may be employed in conformity with the formulas $$ROH, R(OC_2H_4)_nOH, \text{ and } R'(OC_2H_4)_nOH$$

previously set forth are: where R is an alkyl group including an octyl, nonyl, decyl, undecyl, dodecyl, cetyl, or octadecyl group and where R' is an alkylphenyl group including methylamylphenyl, diamylphenyl, octylphenyl, methyloctylphenyl, amyloctylphenyl, heptyloctylphenyl, dodecylphenyl, or pentadecylphenyl group. The integer $n$ is one to eighteen or more as previously stated. The alkyl group may be of the straight or branched chain type. One or two propoxy units may be used either in the absence of or in addition to the prescribed ethoxy units. The propoxy units have been found to be equivalent to that extent.

The present invention may be more fully understood from the following illustrative examples. Parts by weight are used throughout.

*Example 1*

Purified thionyl chloride, in the amount of 111.5 parts, was added gradually over a one hour period to 264 parts of

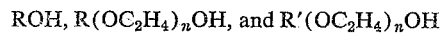

The temperature, which was maintained at 20°–30° C. during the thionyl chloride addition, was gradually raised to 100°–105° C. and maintained in that range for four hours. The system was cooled to 50° C. and the pressure reduced to 20–30 mm. Excess thionyl chloride was removed by distillation with the temperature being raised to 100° C. The hot product was then filtered through a thin bed of filter aid. The filtrate had a color corresponding to 12+ on the Gardner color scale. The original hydroxy number of the reactant alcohol was 165–167, whereas the hydroxy number of the product exceeded 26, indicating that a substantial part of the alcohol was unreacted. The chlorine content of the product was 9.3% (theoretical 9.97), indicating about a 93% conversion. The product having a color of 12+ was treated with 7 parts of finely divided carbon for one hour and then the carbon was filtered off. The color of the product was 8+ on the Gardner color scale.

*Example 2*

The chlorination of Example 1 was conducted using, in addition to the reactants, 2–4% of finely divided carbon introduced at the beginning of the reaction. The reaction continued until all of the sulfur dioxide and hydrogen chloride formed bubble free from the remaining product. The time of reaction was less than three hours. The product was filtered and had a color of 2–4 on the Gardner color scale. Analytical determinations for chlorine in the product gave values of 9.9 and 10.1% (av. 10.0%) (9.97% theoretical) and indicated a quantitative reaction. There was no detectable hydroxyl number.

*Example 3*

The chlorination of Example 2 was conducted using as the alcohol $C_{12}H_{25}(OCH_2CH_2)_3OH$ which has a hydroxyl number of 173. The reaction proceeded as described in Example 2. The filtered product had a color of 4–5 on the Gardner color scale and a chlorine content of 10.4% (theoretical 10.3%). There was no detectable hydroxyl number.

*Example 4*

A mixture of cetyl and octadecyl alcohols was treated with thionyl chloride in the absence of carbon for four hours at 95°–100° C. The excess thionyl chloride was removed under vacuum and the remaining product was filtered. The product had a color above 18 on the Gardner color scale. The chlorine content of the product was 9.8% (theoretical 12.7%).

*Example 5*

The chlorination of Example 4 was conducted using, in addition to the reactants, 1–2% of finely divided carbon. The carbon was introduced at the beginning of the reaction. The reaction continued until all of the formed sulfur dioxide and hydrogen chloride had evolved. The carbon was removed by filtration. The product had a color corresponding to 15 on the Gardner scale and had a chlorine content of 12.6% (theoretical 12.7%).

*Example 6*

To a mixture of 345 parts of

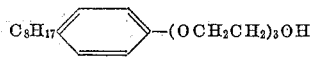

and 3.4 parts of pyridine, 155 parts of thionyl chloride was added at 9 to 25° C. The temperature of the system was increased to 96° to 100° C. and maintained in that range for three hours. At the end of the three hour period the system was cooled and the pressure reduced to 30–40 mm. The excess thionyl chloride was removed by distillation under vacuum during which time the temperature eventually reached 100° C. About 3% of finely divided carbon was added to the product and the temperature maintained at 95°–100° C. for 1½ hours. The carbon was filtered off leaving a product having a color of 8 to 9 on the Gardner color scale. The chlorine content was 10.1% (9.97% theoretical).

*Example 7*

The chlorination of Example 6 was conducted except that the carbon was introduced at the beginning of the reaction. A product having a color of 2 to 4 on the Gardner color scale resulted. The chlorine content was 10.1% (9.97% theoretical).

*Example 8*

There were added 119 parts of thionyl chloride to 130 parts of octyl alcohol in the presence of 1 to 2% finely divided carbon. The temperature of the system was raised to 90° to 95° C. and the reaction continued until the evolution of sulfur dioxide and hydrogen chloride ceased. The carbon was removed by filtration giving a product having a color of 8 to 9 on the Gardner color scale and a chlorine content of 23.7% (23.9% theoretical).

*Example 9*

In the presence of 2 to 3% finely divided carbon, 119 parts of purified thionyl chloride were reacted with 970 parts of

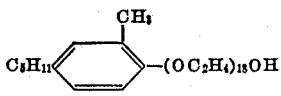

at a temperature of 90° to 100° C. At the completion of the reaction the carbon was filtered off leaving a product having a color of 2 to 3 on the Gardner color scale and a chlorine content of 3.5% (theoretical 3.5%).

*Example 10*

There were reacted 119 parts of purified thionyl chloride with 392 parts of

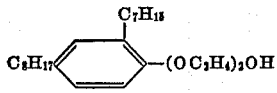

in the presence of 2 to 3% finely divided carbon at a temperature of 95° to 105° C. The carbon was filtered off at the termination of the reaction. The product had a color of 2 to 4 on the Gardner color scale and a chlorine content of 8.8% (8.7% theoretical).

*Example 11*

A mole of thionyl chloride (119 parts) was added to a mole (262 parts) of $C_8H_{17}(OC_2H_4)_3OH$ in the presence of 3 to 4% finely divided carbon. The temperature of the system was maintained at 90° to 100° C. during the course of the reaction. After the reaction was completed the carbon was filtered off leaving a product having a color 2 to 3 on the Gardner color scale and a chlorine content of 12.5% (12.6% theoretical).

*Example 12*

There were reacted in the presence of 3 to 4% finely divided carbon 119 parts of purified thionyl chloride and 374 parts of $C_{16}H_{33}(OC_2H_4)_3OH$. The reaction temperature was maintained at 95° to 100° C. At the cessation of evolution of sulfur dioxide and hydrogen chloride, which indicated the conclusion of the reaction, the carbon was filtered off. The product had a value of 3 to 4 on the Gardner color scale and had a chlorine content of 9.1% (9.0% theoretical).

We claim:

1. A process for preparing a pure chloride from a monohydric alcohol from the class consisting of ROH, $R(OC_2H_4)_nOH$, and $R'(OC_2H_4)_nOH$, wherein R is an alkyl group of eight to eighteen carbon atoms, R' is an alkylphenyl group in which the total number of carbon atoms in the alkyl portion is six to fifteen, and $n$ is an integer from one to eighteen, consisting essentially of reacting a said alcohol with thionyl chloride in the presence of about ½ to 5% finely divided activated carbon at a reacting temperature of at least 70° C. and under anhydrous conditions, then removing said carbon.

2. A process for preparing a pure chloride from an alcohol containing at least eight carbon atoms consisting essentially of reacting at a reacting temperature of at least 70° C. the alcohol with thionyl chloride in the presence of finely divided activated carbon and under anhydrous conditions, then removing said carbon.

3. A process for preparing a pure chloride from a monohydric alcohol containing at least eight carbon atoms consisting essentially of reacting the alcohol with thionyl chloride in the presence of about ½ to 5% finely divided activated carbon at a temperature between about 70° C. and about 150° C. and under anhydrous conditions, then removing said carbon.

4. A process for preparing a pure chloride from a monohydric alcohol containing between about eight and about fifty-seven carbon atoms consisting essentially of reacting the alcohol with thionyl chloride under anhydrous conditions in the presence of about 1 to 2% finely divided activated carbon at a temperature of about 90° to 110° C., then removing said carbon.

5. A process for preparing a pure chloride from a monohydric alcohol containing between about eight and about fifty-seven carbon atoms consisting essentially of reacting at a temperature of about 90° to 110° C. in the presence of 1 to 2% finely divided activated carbon said alcohol with thionyl chloride under anhydrous conditions until the evolution of the formed sulfur dioxide and hydrogen chloride ceases, then removing said carbon.

6. A process for preparing a pure chloride from the alcohol having the formula

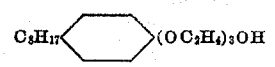

consisting essentially of reacting said alcohol with thionyl chloride under anhydrous conditions in the presence of about 1 to 2% finely divided activated carbon at a temperature of about 90° to 110° C., then removing said carbon.

7. A process for preparing a pure chloride from the alcohol having the formula $C_{12}H_{25}(OC_2H_4)_3OH$ consisting essentially of reacting said alcohol with thionyl chloride under anhydrous conditions in the presence of about 1 to 2% finely divided activated carbon at a temperature of about 90° to 110° C., then removing said carbon.

8. A process for preparing a pure chloride from the alcohol having the formula $C_{18}H_{37}OH$ consisting essentially of reacting said alcohol with thionyl chloride under anhydrous conditions in the presence of about 1 to 2% finely divided activated carbon at a temperature of about 90° to 110° C., then removing said carbon.

References Cited in the file of this patent

Groggins: Unit Processes in Organic Synthesis (4th ed.), N. Y., McGraw-Hill Book Co. Inc. (1952) (pp. 224, 237–8).

Wagner et al.: Synthetic Organic Chemistry (1st ed.), N. Y., John Wiley & Sons, Inc. (1953) (p. 92).